UNITED STATES PATENT OFFICE.

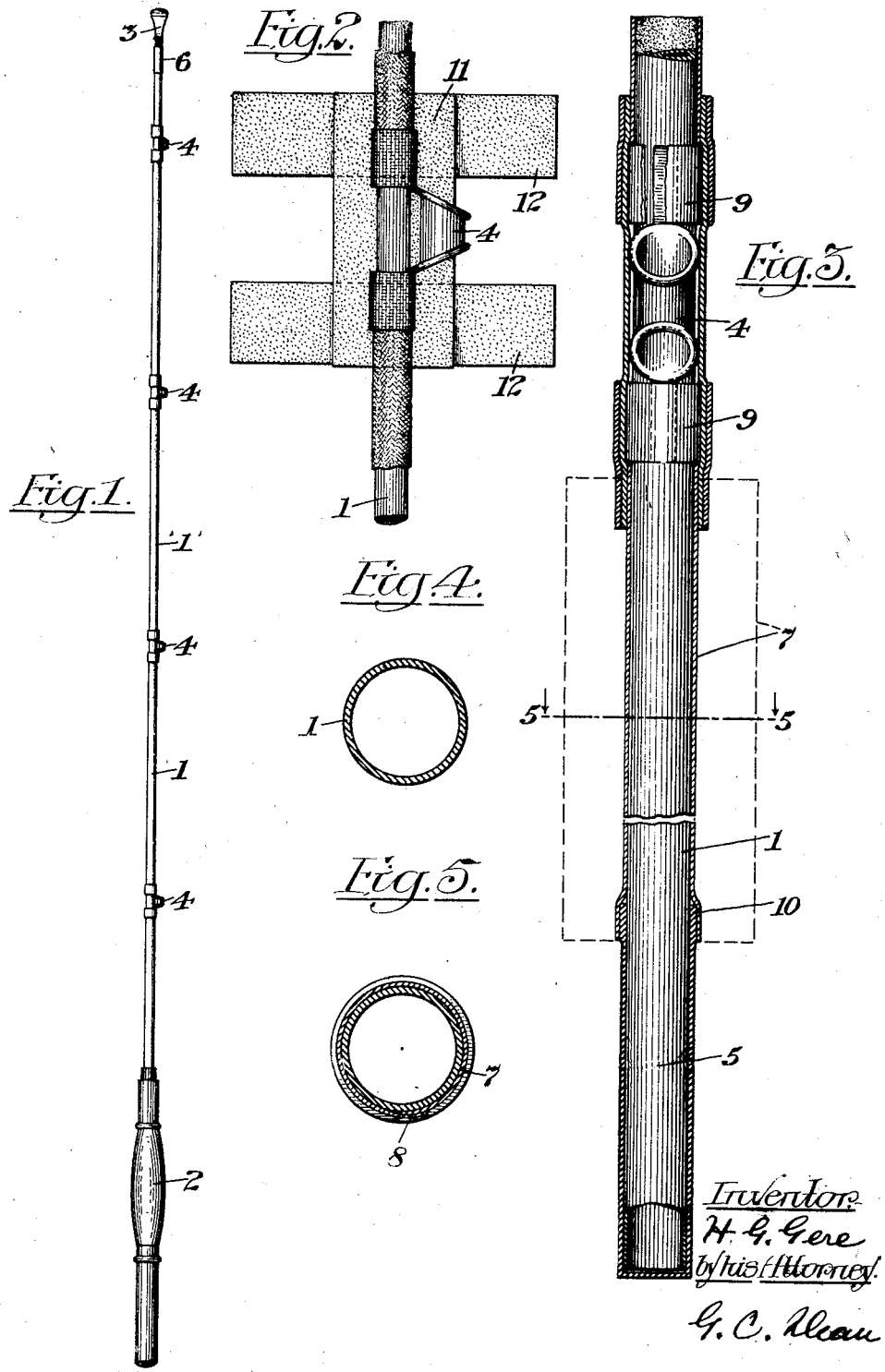

HARRY G. GERE, OF HACKENSACK, NEW JERSEY.

FISHING-ROD.

1,231,150.

Specification of Letters Patent.   Patented June 26, 1917.

Application filed April 19, 1917.   Serial No. 163,107.

*To all whom it may concern:*

Be it known that I, HARRY G. GERE, a citizen of the United States, and resident of Hackensack, in the county of Bergen and State of New Jersey, have invented certain new and useful Improvements in Fishing-Rods, of which the following is a specification.

This invention relates to steel fishing rods of which the well known Bristol rod is an example. These rods are steel tubes having brass telescoping members secured to adjacent sections. The tube is covered with a hard enamel or enamel paint which sufficiently protects the parts from rust when used on fresh water, but such protection is wholly insufficient for salt water and these rods are not recommended for salt water fishing even by the makers.

Many attempts have been made to provide rods of this class with an additional protective coating but the various paints, enamels, etc., available for the purpose will not stick to the smooth surface of the protective coating applied by the manufacturer of the rod.

As a result of experiments in this line, I have finally devised a coating which is perfectly usable or which is well adapted for use on steel rods now on the market. It is applicable to the short heavy casting rods and to the long light rods but it finds its greatest practical utility in connection with the latter because it renders available for salt water fishing, the superior flexibility of the latter thus greatly enhancing the sport enjoyed by those who practice this kind of fishing.

According to my invention, I apply to the commercially existing types of steel fishing rod, preferably in addition to rather than as a substitute for the enamel applied by the manufacturer, a protective covering consisting of fabric coated on one side with a non-drying adhesive. A very satisfactory material for this purpose is ordinary surgeon's plaster which, as obtainable at all drug stores, consists of a tape or ribbon having the non-drying adhesive impregnated therein and constituting a distinct coating of considerable thickness on one surface only. It contains zinc oxid and this seems to improve the protective qualities of the tape when used for my purpose.

I preferably use tape cut to a length slightly greater than the steel tube portion of each section of the rod and of suitable width to encircle the same with a slight overlap. This I smoothly apply to the rod taking care to apply longitudinal and circumferential tension sufficient to insure perfect adhesion and a smooth firm overlap of the edges. The tape thus applied extends slightly beyond the length of the steel tube at each end so as to overlap the joint of the steel tube with its brass fittings at each end.

The tape coating thus applied is in turn protected and preferably blacked, or at least darkened by a liquid preparation suitable for this purpose and of such chemical and mechanical qualities as are necessary to avoid hardening the adhesive material of the tape and to avoid impairing the strength and fiber of the latter. A suitable material for this purpose is stove pipe enamel, which, while not impairing the adhesive itself, protects the adhesive and the tape from deleterious action of air, water and sun as well as from wear. Such a coating has the effect of slightly stiffening and strengthening the rod thereby rendering it better adapted for the heavy work of salt water fishing, without materially lessening its sensitiveness.

In the drawings, Figure 1 is a side view of a fishing rod with my invention applied thereto, Fig. 2 is a detail showing the method of application of the protective covering to the rod adjacent one of the line guides, Fig. 3 is a longitudinal sectional view showing the protective covering applied to a length of the rod, Fig. 4 is a transverse section showing the proportions of the steel tube constituting the body of the rod, and Fig. 5 is a transverse section on the line 5—5, Fig. 3.

In Fig. 1 the rod is shown as composed of a single length of steel tubing 1, although it will be understood that such rods commonly comprise two or three lengths of graduated diameters secured together by telescope joints. The single length rod shown in the drawing has the usual handle 2 at one end, tip 3 at the other end and intermediate line guides 4, 4, 4. The steel tube 1 has a brass cap 5 adapted to telescope into a corresponding socket in the handle or where more than one section is employed, into a socket similarly secured to the end of the adjacent section. The tip 3 is similarly secured over the other end of the section by means of the socket portion 6. It will be understood that where other sections or "joints" are employed, that the socket portion 6 which fits the steel tube will have in place of the tip guide 3 a socket into which the cap 5 of the next section will be adapted to fit. These brass terminal members as well as the line guides 4 in tip 3 tightly fit over and are preferably brazed to the steel tube 1.

In practice, the steel tube as well as the adjacent portions of each brass fitting is covered with a continuous coating of hard enamel which, when exposed to the rough usage of salt water fishing, invariably cracks or mars to an extent sufficient to let in the salt water which soon destroys a thin steel tube.

My preferred method of protecting and preserving this enamel covering is illustrated in the drawing. The tape or ribbon 7 impregnated with and having on one side a relatively thick coating of the non-drying adhesive, is formed or selected in a width sufficient to encircle the steel tube 1 and slightly overlap as at 8, Fig. 5. Its length will be sufficient to extend from the ring fitting 9 of one of the line guides 4, down to and over the joint 10 where the terminal brass fitting 5 is brazed to the steel tube 1. Similar lengths are applied between each of the other line guides and the ring fittings 9 thereof are protected by separate pieces of the protecting coating applied as indicated in Fig. 2, where a short lengthwise strip 11 extends the entire distance over the two ring fittings and adjacent portions of the intermediate protective strip 7. Preferably this ring fitting protection is supplemented and protected by the circumferential strips 12, 12 which have a very ample overlap adapted to effectively secure and protect the overlap portion of the longitudinal strips.

It will be understood that strips 7, 11 and 12 are woven to the widths shown in the drawings so that each will have a finished selvage edge which cannot unravel. The tape coating thus applied may be in turn protected and preferably blackened by any liquid preparation suitable for the purpose, as for instance, stove pipe enamel.

While I have shown a desirable method of applying my protective coating, it will be understood that other arrangements of tape are possible and that other lengths of fibrous material having the required textile strength and durability may be employed. Also, other adhesives not containing zinc oxid may be used, provided they have the requisite qualities which will enable them to set sufficiently to lose their stickiness, but not sufficiently to dry or become brittle. Various rubber compounds may be used for this purpose in connection with a filler other than zinc oxid.

I claim:

1. In a fishing rod of the class described, a rod section comprising a thin steel tube having terminal cap fittings and intermediate line guides of brass, in combination with an enamel protective coating and as a protective for the latter, a non-drying adhesive and a fibrous covering over the adhesive, all extending over the entire exposed portion of the steel rod and overlapping said brass fittings.

2. In a fishing rod of the class described, a rod section comprising a thin steel tube having terminal cap fittings and intermediate line guides of brass, in combination with a non-drying adhesive coating and a protecting fabric covering impregnated with the adhesive, all applied to and extending over the entire exposed portion of the steel rod and overlapping said brass fittings.

3. In a fishing rod of the class described, a rod section comprising a thin steel tube having terminal cap fittings and intermediate line guides of brass, in combination with a non-drying adhesive coating and a protecting fabric covering, impregnated with the adhesive, all applied to and extending over the entire exposed portion of the steel rod and overlapping said brass fittings, and a waterproof black enamel protective coating applied over said fabric.

4. In a fishing rod of the class described, a rod section comprising a thin steel tube, terminal cap fittings and intermediate line guides of brass, a protective covering therefor consisting of fabric impregnated with and having on one face a thick coating of non-drying adhesive, said covering being applied over the entire exposed portion of the steel rod and overlapping said brass fittings.

5. In a fishing rod of the class described, a rod section comprising a thin steel tube having terminal cap fittings and intermediate line guides of brass and a protecting enamel applied over the entire exposed portion of the steel rod and overlapping said brass fittings, in combination with a protecting covering consisting of strips of tape or ribbon having a selvage edge and of a width slightly greater than the circumference of said steel tube, said tape or ribbon being impregnated with and having on one face thereof a thick coating of non-drying adhesive, said tape or ribbon being applied to said rod lengthwise thereof with overlapping edges, together with other lengths wound circumferentially about the ends of longitudinal strips.

Signed at New York city in the county of New York and State of New York this 18th day of April, A. D. 1917.

HARRY G. GERE.